US012602094B2

(12) United States Patent
Chen et al.

(10) Patent No.: US 12,602,094 B2
(45) Date of Patent: Apr. 14, 2026

(54) DIRECTION CHANGEABLE RISER CARD FOR AN INFORMATION PROCESSING DEVICE

(71) Applicant: HEWLETT PACKARD ENTERPRISE DEVELOPMENT LP, Spring, TX (US)

(72) Inventors: Kuan-Wei Chen, Taipei (TW); Chih-Wei Chiang, Taipei (TW); Peng ChiangHsieh, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 139 days.

(21) Appl. No.: 18/773,796

(22) Filed: Jul. 16, 2024

(65) Prior Publication Data

US 2026/0023413 A1     Jan. 22, 2026

(51) Int. Cl.
*G06F 1/16* (2006.01)
*G06F 1/185* (2026.01)
*H01R 12/72* (2011.01)
*H01R 12/73* (2011.01)

(52) U.S. Cl.
CPC ............ *G06F 1/185* (2013.01); *H01R 12/721* (2013.01); *H01R 12/737* (2013.01)

(58) Field of Classification Search
CPC .. H05K 7/1461; H05K 7/1489; H05K 7/1409; G06F 1/183
See application file for complete search history.

(56) References Cited

U.S. PATENT DOCUMENTS

| | | | | |
|---|---|---|---|---|
| 5,594,621 | A | * | 1/1997 | van Rumpt ............. G06F 1/185 |
| | | | | 439/631 |
| 6,731,515 | B2 | | 5/2004 | Rhoads |
| 2007/0101037 | A1 | | 5/2007 | Lin et al. |
| 2008/0052462 | A1 | * | 2/2008 | Blakely ............... G06F 13/1673 |
| | | | | 711/115 |
| 2009/0147492 | A1 | * | 6/2009 | Heinrichs ................ H05K 1/14 |
| | | | | 361/784 |
| 2011/0249397 | A1 | | 10/2011 | Liu et al. |
| 2013/0238828 | A1 | | 9/2013 | Lin |
| 2016/0170928 | A1 | | 6/2016 | Tamarkin et al. |
| 2023/0344159 | A1 | * | 10/2023 | Hsu ...................... H01R 12/737 |
| 2024/0204433 | A1 | * | 6/2024 | Chen ..................... H01R 12/716 |
| 2024/0381561 | A1 | * | 11/2024 | Tsai ...................... H05K 7/1489 |
| 2025/0331118 | A1 | * | 10/2025 | Chen .................... H05K 7/1461 |

* cited by examiner

*Primary Examiner* — Anthony M Haughton
*Assistant Examiner* — Rashen E Morrison
(74) *Attorney, Agent, or Firm* — Hewlett Packard Enterprise Patent Department

(57) ABSTRACT

A direction changeable riser card includes a circuit board and first, second, third, and fourth riser connectors. The first connector is positioned at a first edge and the second connector is positioned at a second edge of the circuit board, the third connector is positioned at the second edge and adjacent to the second connector, and the fourth connector is mounted to a face of the circuit board and electrically connected to the first, second, and third connectors, and configured to mate with an expansion connector of an expansion card. The riser card is configured to be interchangeably mountable on a system board in a first mounting orientation associated with the face of the circuit board facing along a first direction, and in a second mounting orientation associated with the face of the circuit board facing along a second direction, with the circuit board being perpendicular to the system board.

20 Claims, 7 Drawing Sheets

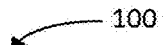
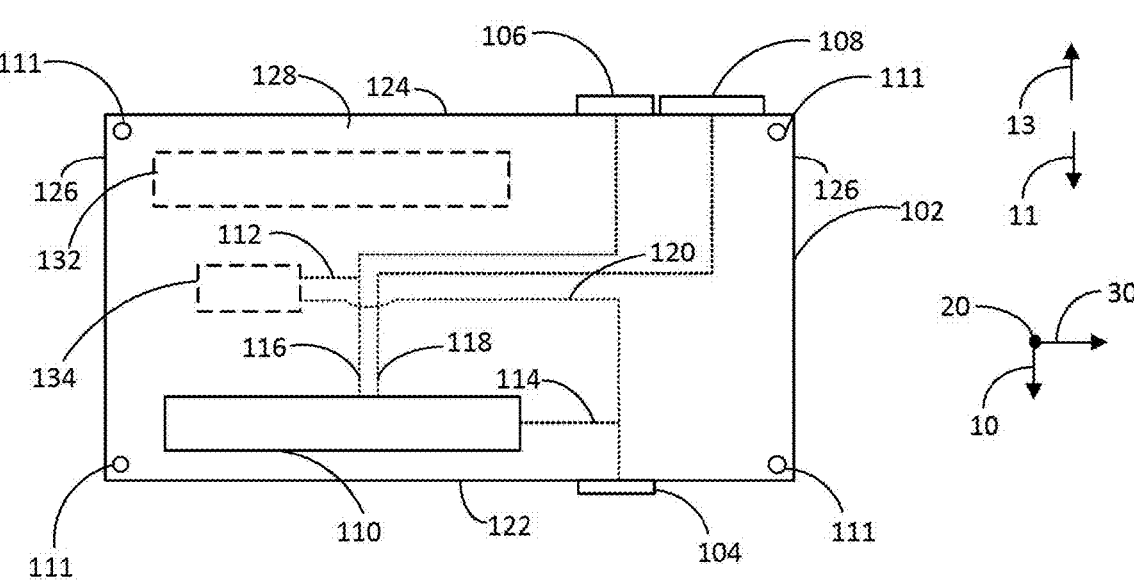
FIG. 1
FIG. 2

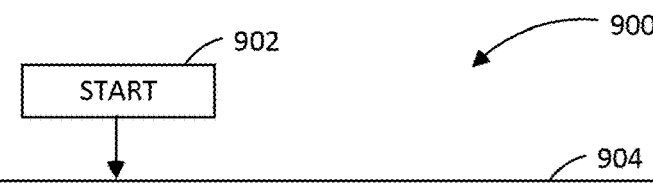

_902_

START

_900_

_904_

MOUNT THE DIRECTION CHANGEABLE RISER CARD ON A PRIMARY SYSTEM BOARD OF THE INFORMATION PROCESSING DEVICE IN A FIRST MOUNTING ORIENTATION, SUCH THAT A FIRST RISER CONNECTOR OF THE DIRECTION CHANGEABLE RISER CARD IS DETACHABLY MATED WITH A FIRST SYSTEM BOARD CONNECTOR MOUNTED TO A FACE OF THE PRIMARY SYSTEM BOARD,

WHERE THE FIRST RISER CONNECTOR IS POSITIONED AT A FIRST EDGE OF A CIRCUIT BOARD OF THE DIRECTION CHANGEABLE RISER CARD,

WHERE THE DIRECTION CHANGEABLE RISER CARD FURTHER INCLUDES A SECOND RISER CONNECTOR POSITIONED AT A SECOND EDGE OPPOSITE TO THE FIRST EDGE OF THE CIRCUIT BOARD AND A THIRD RISER CONNECTOR POSITIONED AT THE SECOND EDGE AND ADJACENT TO THE SECOND RISER CONNECTOR, AND

WHERE THE FIRST MOUNTING ORIENTATION IS ASSOCIATED WITH THE CIRCUIT BOARD BEING PERPENDICULAR TO THE PRIMARY SYSTEM BOARD, AND A FACE OF THE CIRCUIT BOARD FACING ALONG A FIRST DIRECTION

_906_

DETACHABLY MATE A FIRST CABLE CONNECTOR OF A FIRST CABLE TO THE THIRD RISER CONNECTOR, AND A SECOND CABLE CONNECTOR OF THE FIRST CABLE TO A SECOND SYSTEM BOARD CONNECTOR MOUNTED TO THE FACE OF THE PRIMARY SYSTEM BOARD

_908_

CONNECT A FIRST EXPANSION CARD TO THE DIRECTION CHANGEABLE RISER CARD SUCH THAT A FIRST EXPANSION CONNECTOR OF THE FIRST EXPANSION CARD MATES WITH A FOURTH RISER CONNECTOR OF THE DIRECTION CHANGEABLE RISER CARD,

WHERE A MATING AXIS OF THE FIRST EXPANSION CONNECTOR AND THE FOURTH RISER CONNECTOR IS PERPENDICULAR TO THE CIRCUIT BOARD,

WHERE THE FOURTH RISER CONNECTOR IS MOUNTED TO THE FACE OF THE CIRCUIT BOARD AND ELECTRICALLY CONNECTED TO THE FIRST, SECOND, AND THIRD RISER CONNECTORS, AND

WHERE THE FOURTH RISER CONNECTOR IS CONFIGURED TO RECEIVE POWER AND SIDEBAND SIGNALS FROM THE FIRST SYSTEM BOARD CONNECTOR VIA THE FIRST RISER CONNECTOR, AND DATA SIGNALS FROM THE SECOND SYSTEM BOARD CONNECTOR VIA THE FIRST CABLE, AND THE THIRD RISER CONNECTOR.

_910_

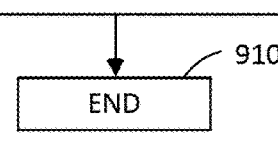

END

FIG. 9

DIRECTION CHANGEABLE RISER CARD FOR AN INFORMATION PROCESSING DEVICE

BACKGROUND

An information processing device such as a computer, a networking device, or the like may include a primary system board (e.g., a motherboard or a host processor module) having hardware components such as central processor units, resistors, capacitors, or the like to provide some basic functions. In order to pursue stronger performance and/or expand functionality of the device, additional hardware components such as an expansion card (e.g., display card) may be coupled to the primary system board. In some information processing devices, the primary system board may include a connector (e.g., a system board connector) that can directly receive the expansion card. However, in other information processing devices, the primary system board may lack the appropriate number or type of connectors needed to receive desired expansion card(s), or the connectors may be present but in an inconvenient location or orientation, and thus in some information processing devices, another card (or an intermediary card) which carries an intermediary connector that is suitable for the expansion card may be coupled to the primary system board, thus providing the needed connection point for the expansion card. Such an intermediary card is generally referred to as a riser card and the intermediary connector is referred to as a riser connector. Further, the expansion cards may come in a variety of sizes and form factors, including, for example, a full-height expansion card and a low-profile expansion card.

BRIEF DESCRIPTION OF THE DRAWINGS

Various examples will be described below with reference to the following figures.

FIG. 1 illustrates a block diagram of a direction changeable riser card according to an example of the present disclosure.

FIG. 2 illustrates a block diagram of a portion of an information processing device including a chassis, a primary system board, and a first riser assembly having a direction changeable riser card of FIG. 1 mounted on the primary system board in a first mounting orientation according to an example of the present disclosure.

FIG. 9 is a flowchart depicting a method installing a direction changeable riser card and one or more expansion cards in an information processing device according to one example of the present disclosure.

DETAILED DESCRIPTION

Figures 3, 4:
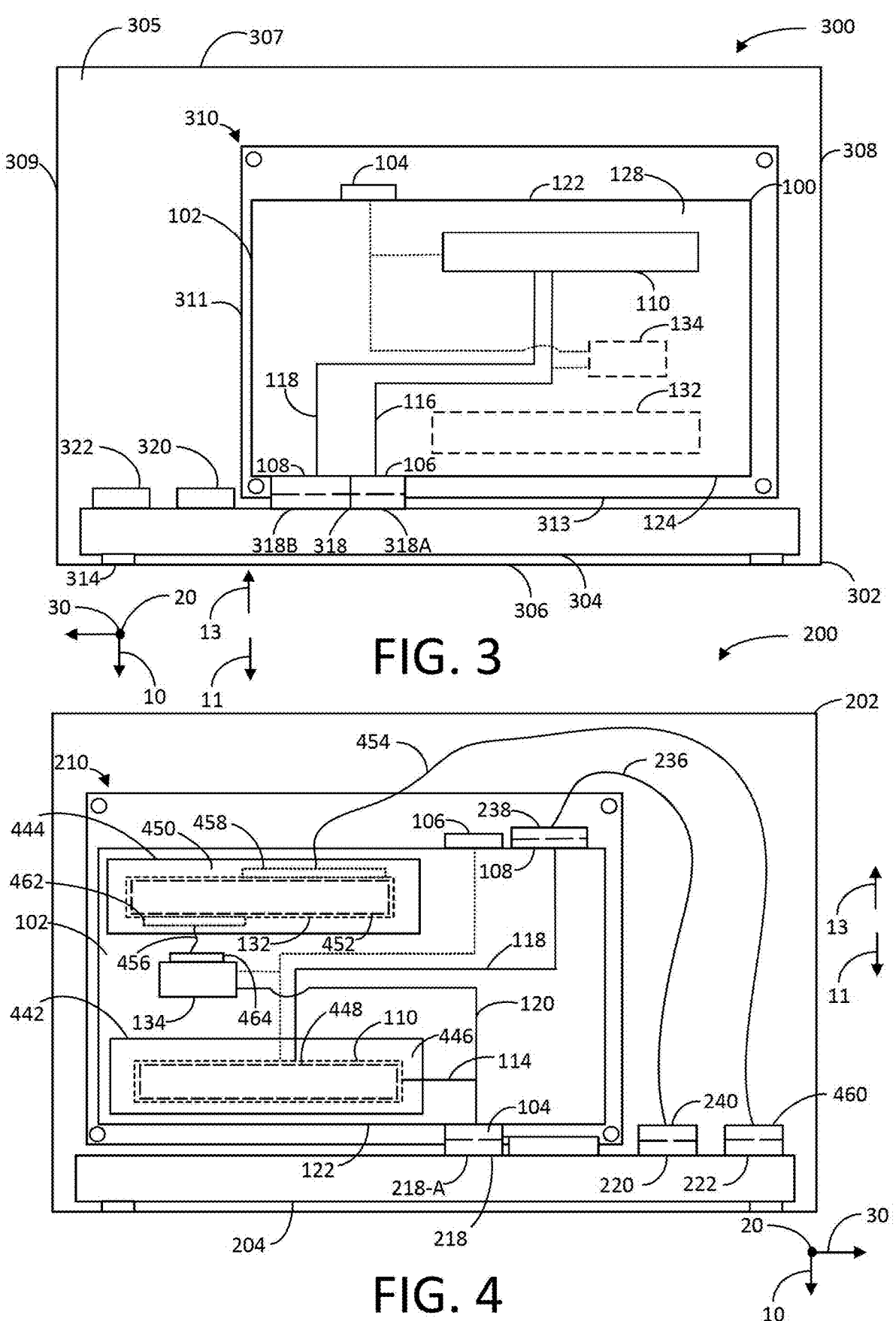
FIG. 3 illustrates a block diagram of a portion of an information processing device including a chassis, a primary system board, and a first riser assembly having a direction changeable riser card of FIG. 1 mounted on the primary system board in a second mounting orientation according to an example of the present disclosure.
FIG. 4 illustrates a block diagram of a portion of the information processing device of FIG. 2 including a first expansion card and a second expansion card according to an example of the present disclosure.

The following detailed description refers to the accompanying drawings. For purposes of explanation, certain examples are described with reference to the components illustrated in FIGS. 1-9. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

A riser card is an electronic card including a circuit board and riser connectors (e.g., electrical connectors) having a first riser connector positioned at an edge of the circuit board and a second riser connector mounted to a face of the circuit board. The circuit board is configured to be coupled to a primary system board of an information processing device by removably connecting the first riser connector to a system board connector of the primary system board to receive power signals, data signals, and sideband signals from the system board connector. An expansion card is another electronic card including an expansion circuit board and an expansion connector (e.g., an electrical connector) positioned at an edge of the expansion circuit board. The expansion circuit board is configured to be coupled to the circuit board by removably connecting the expansion connector to the second riser connector such that the expansion card is electrically connected to the primary system board via the riser card. A riser assembly includes a riser cage that is configured to support the riser card, and to further support the expansion card added to the information processing device. For example, the riser assembly is installed in the information processing device such that the riser cage is connected to a chassis and the riser card is electrically connected to the primary system board by detachably mating the first riser connector with the system board connector. The expansion card may be disposed in the riser assembly such that the riser cage further supports the expansion card, and the expansion card is electrically connected to the riser card by detachably mating the expansion connector to the second riser connector, thus allowing the expansion card to be electrically connected to the primary system board via the riser card. Accordingly, when the expansion card is connected to the riser card, electrical signals from the expansion card may be transferred to the primary system board via the riser card. This may allow a type of system board connector that the primary system board lacks to be added, or the number of such system board connectors to be expanded, or the locations of such system board connectors to be repositioned too somewhere more convenient.

In some cases, when the riser cage is installed in the information processing device, the first riser connector of the riser card may detectably mate with the system board connector of the primary system board with the face of the circuit board facing along a first direction and the circuit board being perpendicular to the primary system board. In such cases, the first riser connector may have a complementary profile to that of the system board connector, thus allowing these two connectors to detachably mate with one another. Further, the expansion card may be disposed in the riser cage with the edge of the expansion card facing along a second direction opposite to the first direction such that the expansion connector positioned at the edge of the expansion card may detachably mate with the second riser connector mounted to the face of the circuit board.

Due to space constraints in the chassis, at times it may be desired to dispose the expansion card in the riser cage with the edge of the expansion card facing along the first direction instead of the second direction. In such circumstances, the riser card must be rotated 180 degrees relative to an axis (e.g., a vertical axis perpendicular to the primary system board) such that the face of the riser card faces along the second direction instead of the first direction, thus allowing the expansion connector of the expansion card to detachably mate with the second riser connector of the riser card. However, in such circumstances, when the riser card is rotated 180 degrees relative to the axis, the first riser connector positioned at the edge of the riser card, may have also turned 180 degrees, thus the first riser connector may not have a complementary profile to that of the system board connector of the primary system board, thereby denying these two connectors to detachably mate with one another.

Hence, the information processing device may require a new riser card which includes a first riser connector that has a complementary profile to that of the system board connector, even when the face of the circuit board is facing along the second direction. Thus, the first riser connector of the new riser card may detachably mate with the system board connector, and the second riser connector mounted to the face of the new riser card with the face of the circuit board facing along the second direction may detachably mate with the expansion connector positioned at the edge of the expansion card with the edge of the expansion card facing along first direction.

Further, even though the riser cards are often configured to support one expansion card, in some circumstances, it may be desired for the information processing device to have the riser card that supports at least two expansion cards to improve performance and/or expand functionality of the information processing device. Hence, in such circumstances, the information processing device may require a new riser card that includes at least two second riser connectors which may be configured to detachably mate with individual expansion connector of two different expansion cards.

Therefore, the information processing device may require multiple types of riser cards to electrical connect with different types of expansion cards. Further, since multiple types of riser cards are available, customers may need to order different types of riser cards to suit their requirements, and this may be cumbersome and difficult to manage. In addition, multiple different types of riser cards may need to be produced, and this may result in additional SKUs being needed and different inventory to be maintained, which can in turn increase costs. Furthermore, replacing the riser card with a new type of riser card may be cumbersome, time consuming, expensive, and depend on the availability of inventory of such new riser card.

A technical solution to the aforementioned problems may include providing a direction changeable riser card that is reconfigurable into multiple configurations that are compatible to detachably mate with a primary system board and with multiple expansion cards and with the expansion card having an edge facing along one of a first direction or a second direction. In some examples, the direction changeable riser card includes a first riser connector positioned at a first edge of a circuit board, a second riser connector and a third riser connector positioned adjacent to each other and at a second edge opposite to the first edge of the circuit board, and a fourth riser connector mounted to a face of the circuit board. In such examples, the fourth riser connector may be electrically connected to the first, second, and third riser connectors.

In one or more examples, the direction changeable riser card may be interchangeably mounted on a primary system board in a first mounting orientation associated with the face of the circuit board facing along the first direction and the first edge of the circuit board facing the primary system board, and in a second mounting orientation associated with the face of the circuit board facing along a second direction opposite to the first direction and the second edge of the circuit board facing the primary system board, along with the circuit board being perpendicular to the primary system board.

Accordingly, in the first mounting orientation of the riser card, the first riser connector positioned at the first edge of the circuit board may be detachably mated with a system board connector of the primary system board. In other words, the first riser connector positioned at the first edge may have a compatible profile to that of the system board connector, thereby allowing the first riser connector to detachably mate with the system board connector. Therefore, when the expansion card is disposed in the riser cage with an edge of the expansion card facing along the second direction opposite to the first direction, an expansion connector of the expansion card positioned at the edge of the expansion card may be detachably mated with the fourth riser connector mounted to the face of the riser card facing the first direction.

Furthermore, the riser card may be reconfigured to the second mounting orientation (e.g., a second configuration) by flipping the circuit board upside down instead of rotating the circuit board 180 degrees relative to a first axis (e.g., a horizontal axis parallel to the primary system board), thus causing the second edge of circuit board facing the primary system board and the face of the circuit board facing the second direction. Accordingly, in the second configuration of the riser card, the second and third connectors positioned at the second edge of the circuit board may be detachably mated with the system board connector. In other words, the second and third riser connectors positioned at the second edge may have a compatible profile to that of the system board connector, thereby allowing the second and third riser connectors to detachably mate with the system board connector. Therefore, when the expansion card is disposed in the riser cage with the edge of the expansion card facing along the first direction, the expansion connector of the expansion card positioned at the edge of the expansion card may be detachably mated with the fourth riser connector mounted to the face of the riser card facing the second direction. In one or more examples, each of the first and second riser connectors may be an edge connector configured to communicate power and sideband signals, the third riser connector is the edge connector configured to communicate data signals, and the fourth riser connector is a PCI-e socket connector.

The riser card may include a fifth riser connector disposed adjacent to the first riser connector and mounted to the face of the circuit board. In such examples, the riser card may further include a sixth riser connector mounted to the face of the circuit board. The sixth riser connector may be electrically connected to the first riser connector, the second riser connector, to the fifth riser connector. In one or more examples, the fifth riser connector is the PCI-e connector, and the sixth riser connector is the edge connector configured to communicate power and sideband signals.

In some examples, in each of the first mounting orientation and the second mounting orientation of the riser card, the fifth riser connector may be configured to detachably mate with a second expansion connector of a second expansion card. Thus, the riser card may allow the expansion card to be detachably mated with the fourth riser connector and the second expansion card to be detachably mated with the fifth riser connector. Accordingly, the riser card may allow multiple expansion cards to be vertically stacked relative to one another.

Since a new riser card may be easily transitioned into multiple configurations either by flipping the riser card upside down to detachably mate with the expansion card facing one of the first direction or the second direction or by removably mounting additional connectors to the riser card to detachably mate with multiple expansion cards, the new riser card provides flexibility, serviceability, and benefit from supply chain in terms of reducing number of ready-made riser card needed in the inventory. Further, the new riser card is inexpensive to assemble, maintain, and replace, since the first, second, third connector, and fourth connectors of the riser card is pre-installed to the circuit board, and only the fifth and sixth riser connectors may have to be added to the riser card to assemble the new riser card to support multiple expansion cards.

Referring to the Figures, FIG. 1 depicts a block diagram of a direction changeable riser card 100. It should be understood that FIG. 1 is not intended to illustrate specific shapes, dimensions, or other structural details accurately or to scale, and that implementations of the direction changeable riser card 100 may have different numbers and arrangements of the illustrated components and may also include other parts that are not illustrated. The direction changeable riser card 100 is a peripheral card that may plug into a system board connector of the primary system board and enable an information processing device to control a peripheral device (e.g., an expansion card) connected to the peripheral card. The direction changeable riser card 100 includes a circuit board 102, a plurality of electrical connectors, e.g., a first riser connector 104, a second riser connector 106, a third riser connector 108, a fourth riser connector 110, and a plurality of mounting holes 111.

The circuit board 102 may be a printed circuit board having internal circuitry 112, 114, 116, 118, 120, therein. The circuit board 102 has a first edge 122 (e.g., bottom edge), a second edge 124 (e.g., a top edge), a pair of peripheral edges 126 connected to the first and second edges 122, 124, respectively, a face 128 (or a first face), and a second face (not shown) opposite to the face 128. In some examples, the plurality of mounting holes 111 is disposed adjacent to the perimeter of the circuit board 102. In such examples, the direction changeable riser card 100 may be coupled to a riser cage by extending fasteners (not shown)

into the plurality of mounting holes 111 in the circuit board 102 and a plurality of mounting openings (not shown) in the riser cage.

The first riser connector 104 is an edge connector (e.g., golden fingers connector) positioned at the first edge 122 of the circuit board 102. The first riser connector 104 is oriented parallel to the circuit board 102 and extends vertically from the first edge 122 of the circuit board 102 along a first vertical direction 11 parallel to an axis 10 in the state shown in FIG. 1 and configured to directly mate with a first system board connector 218 of a primary system board 204 (as shown in FIGS. 2 and 4). In some examples, the first riser connector 104 may have a profile that is complementary to the profile of a modular extensible input output (M-XIO) plug connector. In such examples, the first riser connector 104 may be used for transferring power and sideband signals.

The second riser connector 106 is an edge connector (e.g., golden fingers connector) positioned at the second edge 124 opposite to the first edge 122 of the circuit board 102. The second riser connector 106 is oriented parallel to the circuit board 102 and extends vertically from the second edge 124 of the circuit board 102 along a second vertical direction 13 parallel to the axis 10 in the state shown in FIG. 1 and configured to directly mate with a first system board connector 318 of a primary system board 304 (as shown in FIG. 3). In some examples, the second riser connector 106 may have a profile that is complementary to the profile of a modular extensible input output (M-XIO) plug connector. In such examples, the second riser connector 106 may be used for transferring power and sideband signals.

The third riser connector 108 is an edge connector (e.g., golden fingers connector) positioned at the second edge 124 and adjacent to the second riser connector 106. The third riser connector 108 is oriented parallel to the circuit board and extends vertically from the second edge 124 of the circuit board 102 along the second vertical direction 13 parallel to the axis 10 in the state shown in FIG. 1. In some examples, the third riser connector 108 may be configured to directly mate with a second system board connector 320 of the primary system board 304 (as shown in FIG. 3). In some other examples, the third riser connector 108 may be configured to mate with a second system board connector 220 via a first cable 236 (as shown in FIGS. 2 and 4). In certain examples, the third riser connector 108 may be defined by two connector portions (e.g., a first connector portion and a second connector portion (not shown) which are spaced apart from each other). In some examples, the third riser connector 108 may have a profile that is complementary to the profile of a modular extensible input output (M-XIO) plug connector. In such examples, the third riser connector 108 may be used for transferring data signals.

In one or more examples, a combination of the second and third riser connectors 106, 108 may have a profile that is complementary to the profile of a modular extensible input output connector (M-XIO connector). Accordingly, the combination of the second and third riser connectors 106, 108 may be configured to transfer the power, sideband, and data signals from the primary system board 304 to the direction changeable riser card 100, as shown in FIG. 3. It may be noted that the combination of the second and third riser connectors 106.108, e.g., the M-XIO connector is a standardized connector defined as per the guidelines of an open compute program (OCP program).

Figure 5:
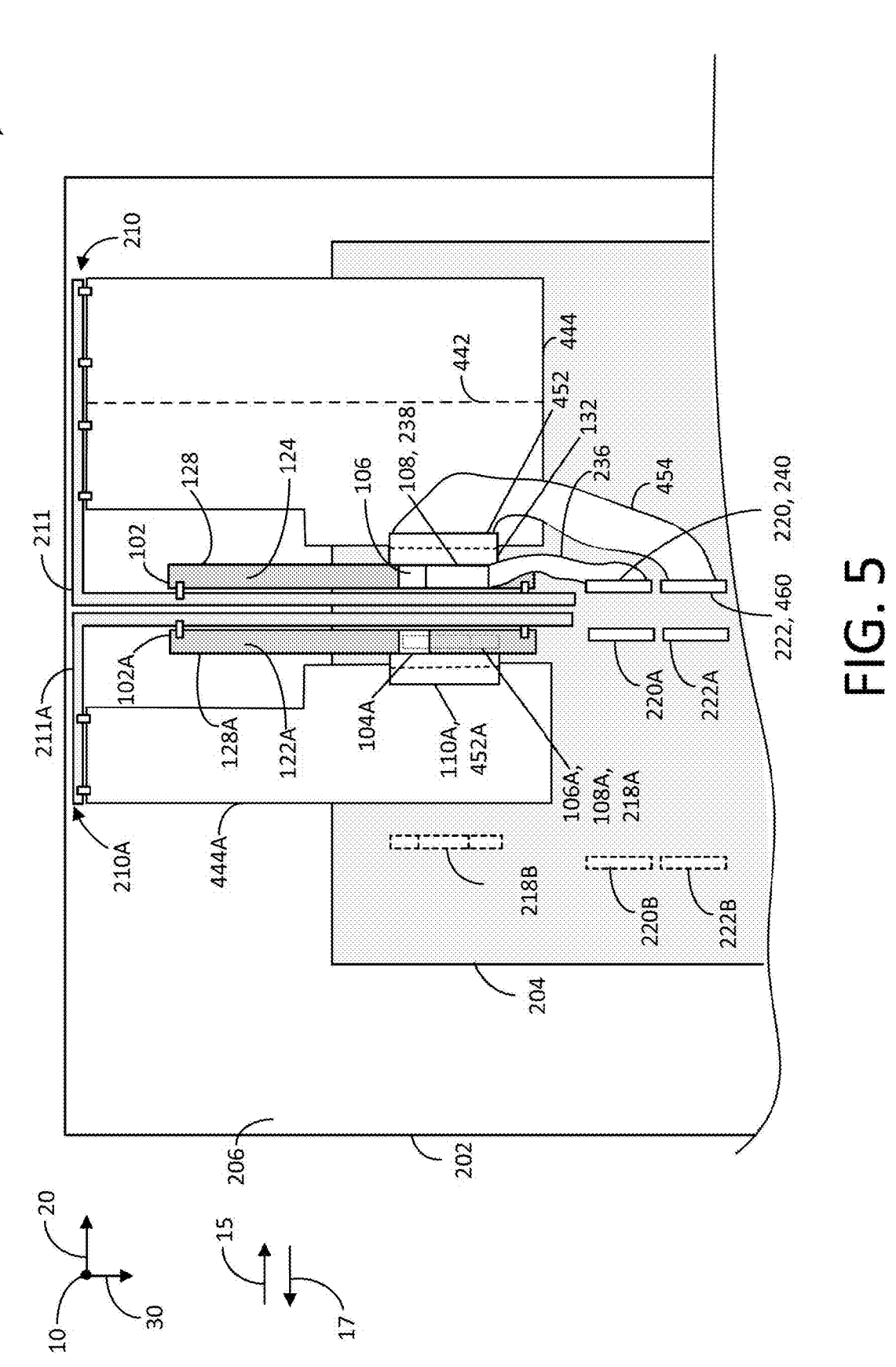
FIG. 5 illustrates a block diagram of a portion of the information processing device of FIG. 4 having a second riser assembly according to an example of the present disclosure.

The fourth riser connector 110 is a socket connector having a profile such as a PCI-e socket connector. In some examples, the fourth riser connector 110 is mounted to the face 128 of the circuit board 102 and is oriented perpendicular to the circuit board 102. In particular, the fourth riser connector 110 is oriented to extend horizontally from the face 128 of the circuit board 102 along a first direction 15 (as shown in FIG. 5) parallel to a first axis 20 in the state shown in FIG. 1 and configured to mate with a first expansion connector 448 of a first expansion card 442 (as shown in FIG. 4). In such examples, the first expansion connector 448 may have a profile such as a PCI-e plug connector which is compatible with the profile of the fourth riser connector 110 such as the PCI-e socket connector. In one or more examples, the fourth riser connector 110 is electrically connected to the first, second, and third riser connectors 104, 106, 108. Specifically, electrical contacts of the fourth riser connector 110 are electrically connected via the internal circuitry 114, 116, 118 (as shown in dotted lines in FIG. 1) in the direction changeable riser card 100 to electrical contacts of the first, second, and third riser connectors 104, 106, 108, respectively. Accordingly, the fourth riser connector 110 may be configured to receive the power and sideband signals from one of the first or second riser connectors 104, 106, respectively and the data signals from the third riser connector 108, and transfer the received power, sideband, and data signals to the first expansion card 442.

In some examples, the fourth riser connector 110 may receive the power and sideband signals from the first riser connector 104 via the internal circuitry 114, and the data signals from the third riser connector 108 via the internal circuitry 118. In such examples, the first riser connector 104 may be configured to directly receive the power and sideband signals from the first system board connector 218 (as shown in FIGS. 2 and 4) and the third riser connector 108 may be configured to receive the data signals from the second system board connector 220 via the first cable 236 (as shown in FIGS. 2 and 4).

In some other examples, the fourth riser connector 110 may receive the power and sideband signals from the second riser connector 106 via the internal circuitry 116, and the data signals from the third riser connector 108 via the internal circuitry 118. In such examples, the second riser connector 106 and the third riser connector 108 may be configured to directly receive the power and sideband signals, and the data signals from the first system board connector 318 (as shown in FIG. 3).

The direction changeable riser card 100 may further include a fifth riser connector 132 and a sixth riser connector 134. In some examples, the fifth riser connector 132 is a socket connector having a profile such as a PCI-e socket connector. The fifth riser connector 132 may be disposed adjacent to one of the first or second riser connectors 104, 106 and mounted to the face 128 of the circuit board 102. In the example of FIG. 1, the fifth riser connector 132 is disposed adjacent to the first riser connector 104, mounted to the face 128, and oriented perpendicular to the circuit board 102. The fifth riser connector 132 may be configured to mate with a second expansion connector 452 of a second expansion card 444 (as shown in FIG. 4). In such examples, the second expansion connector 452 may have a profile such as a PCI-e plug connector which is compatible with the profile of the fifth riser connector 132 such as the PCI-e socket connector. Further, the fifth riser connector 132 may be configured to mate with a third system board connector 222 of the primary system board 204 via a second cable 454 (as shown in FIG. 4). In such examples, the fifth riser connector 132 may further receive the data signals from the primary system board 204 via the third system board connector 222 and the second cable 454 and transfer the received data signals from the direction changeable riser card 100 to the second expansion card 444.

The sixth riser connector 134 is a socket connector mounted to the face 128 of the circuit board 102 and electrically connected to the first riser connector 104, the second riser connector 106, and fifth riser connector 132. Specifically, electrical contacts of the sixth riser connector 134 are electrically connected via internal circuitry 120, 112 (as indicated by dotted lines in FIG. 1) in the direction changeable riser card 100 to electrical contacts of the first and second riser connectors 104, 106, respectively. Further, the sixth riser connector 134 may be configured to mate with the fifth riser connector 132 via a third cable 456 (as shown in FIG. 4). Accordingly, the sixth riser connector 134 may be configured to receive the power and sideband signals from one of the first or second riser connectors 104, 106 via the internal circuitry 120, 112, respectively. In such examples, the sixth riser connector 134 may be configured to transfer the received power and sideband signals to the fifth riser connector 132 via the third cable 456. The fifth riser connector 132 may be configured to transfer the received power and sideband signals to the second expansion card 444.

FIG. 2 depicts a block diagram of an information processing device 200 including a chassis 202, a primary system board 204, and one or more riser assemblies including a first riser assembly 210 having a direction changeable riser card 100 of FIG. 1 mounted on the primary system board 204 in a first mounting orientation and a riser cage 211. It may be noted that FIG. 2 depicts a side view of the information processing device 200. In some examples, the information processing device 200 may be a computer (e.g., a server, a storage device), a networking device (e.g., a switch, an access point), or the like.

The chassis 202 may be an enclosure formed by a pair of peripheral sidewalls 205 (one sidewall is shown in FIG. 2), a base 206, a cover 207, a rear panel 208, and a front panel 209. The pair of peripheral sidewalls 205 are connected to the base 206, the cover 207, the rear panel 208, and the front panel 209 to define an internal volume 212 of the chassis 202.

The primary system board 204 is positioned within the internal volume 212 and mounted on the base 206 via a plurality of support members 214. In some examples, the primary system board 204 is a host processor module. In such examples, the host processor module may include a plurality of electronic components as per the OCP guidelines. In some examples, the primary system board 204 includes a substrate 216 and the plurality of electronic components, such as a central processing unit, resistors, capacitors, data ports, and power ports, or the like mounted on the substrate 216. The primary system board 204 further includes a first system board connector 218, a second system board connector 220, and a third system board connector 222 mount. In some examples, the first system board connector 218 is a modular extensible input output (M-XIO) connector) and each of the second and third system board connectors 220, 222 is an M-XIO receptacle connector. In some examples, each of the first, second, and third system board connectors 218, 220, 222 are mounted on the substrate 216 or a face of the primary system board 204 such that each of those connectors extends vertically from the substrate 216 along a second vertical direction 13 parallel to the axis 10. In such examples, the first system board connector 218 includes a first portion 218-A and a second portion 218-B, the first portion 218-A is configured to transfer power and sideband signals and the second portion 218-B is configured to transfer data signals. Similarly, each of the second and third system board connectors 220, 222, respectively are configured to transfer data signals.

Each riser assembly of the one or more riser assemblies e.g., the first riser assembly 210 includes a direction changeable riser card 100 and the riser cage 211 configured to couple the direction changeable riser card 100 to the chassis 202. The direction changeable riser card includes a circuit board 102, a first riser connector 104, a second riser connector 106, a third riser connector 108, a fourth riser connector 110, and a plurality of mounting holes 111. In some examples, the direction changeable riser card 100 is mounted on the riser cage 211 such that the first edge 122 of the direction changeable riser card 100 is adjacent to a bottom edge 213 of the riser cage 211 and the plurality of mounting holes 111 of the direction changeable riser card 100 is aligned with a plurality of mounting openings 215 of the riser cage 211. In such examples, a fastener of a plurality of fasteners (not shown) may extended through a corresponding hole of the plurality of mounting holes 111 and a corresponding opening of the plurality of mounting openings 215 to detachably couple the direction changeable riser card 100 to the riser cage 211 and thereby form the first riser assembly 210.

The riser cage 211 is configured to removably install the direction changeable riser card 100 in the chassis 202. In some examples, the riser cage 211 is installed adjacent to the rear panel 208 of the chassis 202 such that the direction changeable riser card 100 is interchangeably mounted on the primary system board 204 of the information processing device 200 in a first mounting orientation associated with the face 128 of the circuit board 102 facing along a first direction 15 parallel to a first axis 20.

In the first mounting orientation, the first riser connector 104 is detachably mated with the first system board connector 218 of the primary system board 204 with the circuit board 102 being perpendicular to the primary system board 204. In other words, the direction changeable riser card 100 is mounted on the primary system board 204 positioned below the circuit board 102 such that the first riser connector 104 (e.g., an edge connector) positioned at the first edge 122 of the circuit board 102 mates with the first portion 218-A of the first system board connector 218 (e.g., the M-XIO plug connector) of the primary system board 204. In such examples, the mating of the first riser connector 104 with the first system board connector 218 occurs by a motion of the first riser connector 104 along the first vertical direction 11 parallel to the axis 10 and to the circuit board 102. Accordingly, the first riser connector 104 of the direction changeable riser card 100 may receive power and sideband signals from the first system board connector 218. The first riser connector 104 further transfers the power and sideband signals to the fourth riser connector 110 via internal circuitry 114 of the circuit board 102.

The information processing device 200 further includes a cable assembly including a first cable 236 having a first cable connector 238 at one end (not labeled) and a second cable connector 240 at another end (not labeled). In some examples, the first cable connector 238 is a modular extensible input output receptacle connector and the second cable connector 240 is a modular extensible input output plug connector. The third riser connector 108 is detachably mated with the first cable connector 238 of the first cable 236, and the second cable connector 240 is detachably mated with the second system board connector 220 of the primary system board 204. In other words, the first cable connector 238 (e.g., the M-XIO receptacle connector) mates with the third riser connector 108 (e.g., an edge connector) and the second cable connector 240 (e.g., the M-XIO plug connector) mates with the second system connector (e.g., the M-XIO receptacle connector). In such examples, the mating of the first cable connector 238 with the third riser connector 108 and the mating of the second cable connector 240 with the second system board connector 220 occur by a motion of the first and second cable connectors 238, 240, respectively along the first vertical direction 11 parallel to the axis 10 and to the circuit board 102. Accordingly, the third riser connector 108 receives data signals from the primary system board 204 via the second system board connector 220, the second cable connector 240, the first cable 236, and the first cable connector 238. The third riser connector 108 further transfers the data signals to the fourth riser connector 110 via internal circuitry 118 of the circuit board 102.

FIG. 3 depicts a block diagram of an information processing device 300 including a chassis 302, a primary system board 304, and a first riser assembly 310 having a direction changeable riser card 100 of FIG. 1 mounted on the primary system board 304 in a second mounting orientation opposite to the first mounting orientation, and a riser cage 311. It may be noted that FIG. 3 depicts another side view of the information processing device 300.

The information processing device 300 is substantially similar to the information processing device 200 discussed hereinabove. Hence, the information processing device processing device is not described in greater detail and such not description of the information processing device 300 should not be construed as a limitation of the present disclosure.

The chassis 302 may be an enclosure formed by a pair of peripheral sidewalls 305 (one sidewall is shown in FIG. 2), a base 306, a cover 307, a rear panel 308, and a front panel 309.

The primary system board 304 is mounted on the base 306 via a plurality of support members 314. The primary system board 304 includes a first system board connector 318, a second system board connector 320, and a third system board connector 322 mount. In some examples, the first system board connector 318 includes a first portion 318A and a second portion 318B, the first portion 318A is configured to transfer power and sideband signals and the second portion 318B is configured to transfer data signals. Similarly, each of the second and third system board connectors 320, 322, respectively are configured to transfer data signals.

The direction changeable riser card 100 includes a circuit board 102, a first riser connector 104, a second riser connector 106, a third riser connector 108, and a fourth riser connector 110. In some examples, the direction changeable riser card 100 is mounted on the riser cage 311 such that the second edge 124 of the direction changeable riser card 100 is adjacent to a bottom edge 313 of the riser cage 311. Further, the riser cage 311 is configured to removably install the direction changeable riser card 100 in the chassis 302. In some examples, the riser cage 311 is installed adjacent to the rear panel 308 of the chassis 302 such that the direction changeable riser card 100 is interchangeably mounted on the primary system board 304 of the information processing device 300 in a second mounting orientation associated with the face 128 of the circuit board 102 facing along a second direction 17 (as shown in FIG. 5) opposite to the first direction 15 along the first axis 20. It may be noted herein that the circuit board 102 may be flipped upside down relative to the first axis 20 to shift the direction changeable riser card 100 from the first mounting orientation (as shown in FIG. 2) to the second mounting orientation (as shown in FIG. 3). In other words, the direction changeable riser card 100 of the first riser assembly 310 is configured to be remountable on the primary system board 304 in the second mounting orientation instead of the first mounting orientation as shown in FIG. 2.

In the second mounting orientation, the second and third riser connectors 106, 108 are detachably mated with the first system board connector 318 of the primary system board 304 with the circuit board 102 being perpendicular to the primary system board 304. In other words, the direction changeable riser card 100 is mounted on the primary system board 304 positioned below the circuit board 102 such that the second riser connector 106 (e.g., an edge connector) and the third riser connector 108 (e.g., another edge connector) positioned at the second edge 124 of the circuit board 102 mates with the first portion 318A and the second portion 318B, respectively of the first system board connector 318 (e.g., the M-XIO connector) of the of the primary system board 304. In such examples, the mating of the second riser connector 106 and the third riser connector 108 with the first system board connector 318 occurs by a motion of the second and third riser connectors 106, 108 along the first vertical direction 11 parallel to the axis 10 and to the circuit board 102. Accordingly, the second and third riser connectors 106, 108 of the direction changeable riser card 100 may receive power and sideband signals, and the data signals from the first system board connector 318. The second riser connector 106 further transfers the power and sideband signals to the fourth riser connector 110 via internal circuitry 116 of the circuit board 102. Similarly, the third riser connector 108 further transfers the data signals to the fourth riser connector 110 via internal circuitry 118 of the circuit board 102.

FIG. 4 illustrates a block diagram of the information processing device 200 of FIG. 2 including a first expansion card 442 and a second expansion card 444. The information processing device 200 includes a chassis 202, a primary system board 204, and one or more riser assemblies including a first riser assembly 210 having a direction changeable riser card 100 mounted on the primary system board 204 in a first mounting orientation and a riser cage 211.

Each of the first and second expansion cards 442, 444 may be a PCI-e expansion card such as a graphics processing unit (GPU) card. The first expansion card 442 includes a body 446 and a first expansion connector 448 positioned at an edge (not labeled) of the body 446. Similarly, the second expansion card 444 includes a body 450 and a second expansion connector 452 positioned at an edge (not labeled) of the body 450.

The information processing device 200 further includes a cable assembly having a second cable 454 and a third cable 456. In such examples, each of the second and third cables 454, 456 is configured to transfer the data signals from the primary system board 204 to riser connector, e.g., to the third riser connector 108 and the fifth riser connector 132 of the direction changeable riser card 100. In some examples, the second cable 454 includes a third cable connector 458 at one end (not labeled) and a fourth cable connector 460 at another end (not labeled). Similarly, the third cable 456 includes a fifth cable connector 462 at one end (not labeled) and a sixth cable connector 464 at another end (not labeled). In some examples, the third cable connector 458 is a PCI-e plug, the fourth cable connector 460 is a modular extensible input output plug connector, the fifth cable connector 462 is the PCI-e plug connector, and the sixth cable connector 464 is a plug connector. In some examples, the third cable connector 458 of the second cable 454 is mated with the fifth riser connector 132 of the direction changeable riser card 100 and the fourth cable connector 460 of the second cable 454 is mated with the third system board connector 222 of the primary system board 204 so as to transfer the data signals from the primary system board 204 to the fifth riser connector 132. Similarly, the fifth cable connector 462 of the third cable 456 is mated with the fifth riser connector 132 of the direction changeable riser card 100 and the sixth cable connector 464 of the third cable 456 is mated with the sixth riser connector 134 of the direction changeable riser card 100 so as to transfer the power and sideband signals from the sixth riser connector 134 to the fifth riser connector 132.

As discussed hereinabove, the first riser connector 104 is detachably mated with the first portion 218-A of the first system board connector 218. In such examples, the mating of the first riser connector 104 and the first portion 218-A of the first system board connector 218 occurs by a motion of the first riser connector 104 along the first vertical direction 11 parallel to the axis 10 and to the circuit board 102. Accordingly, the first riser connector 104 of the direction changeable riser card 100 may receive power and sideband signals from the first system board connector 218. The first riser connector 104 further transfers the power and sideband signals to the fourth riser connector 110 via internal circuitry 114 of the circuit board 102. The third riser connector 108 is detachably mated with the first cable connector 238 of the first cable 236 and the second cable connector 240 is detachably mated with the second system board connector 220 of the primary system board 204. In such examples, the mating of the first cable connector 238 with the third riser connector 108 and the mating of the second cable connector 240 with the second system board connector 220 occur by a motion of the first and second cable connectors 238, 240, respectively along the first vertical direction 11 parallel to the axis 10 and to the circuit board 102. Accordingly, the third riser connector 108 receives data signals from the primary system board 204 via the second system board connector 220, the second cable connector 240, the first cable 236, and the first cable connector 238. The third riser connector 108 further transfers the data signals to the fourth riser connector 110 via internal circuitry 118 of the circuit board 102.

In some examples, the first expansion card 442 is connected to the direction changeable riser card 100 of the first riser assembly 210 such that the first expansion connector 448 of the first expansion card 442 mates with the fourth riser connector 110 with a mating axis between the first expansion connector 448 and the fourth riser connector 110 being oriented perpendicular to the circuit board 102 and parallel to the first direction along the first axis 20. Accordingly, the first expansion card 442 receives the power and sideband signals and the data signals from the primary system board 204 via fourth riser connector 110.

The first riser connector 104 of the direction changeable riser card 100 directly receives power and sideband signals from the first portion 218-A of the first system board connector 218. Further, the first riser connector 104 transfers the received power and sideband signals to the sixth riser connector 134 via internal circuitry 114 of the circuit board 102. The sixth riser connector 134 is detachably mated with the sixth cable connector 464 of the third cable 456 and the fifth cable connector 462 is detachably mated with the fifth riser connector 132 of the direction changeable riser card 100. In such examples, the mating of the sixth cable connector 464 with the sixth riser connector 134 and the mating of the fifth cable connector 462 with the fifth riser connector 132 occur by a motion of the sixth and fifth cable connectors 464, 462, respectively along the first vertical direction 11 parallel to the axis 10 and to the circuit board 102. Accordingly, the fifth riser connector 132 receives power and sideband signals from the sixth riser connector 134 via the sixth cable connector 464, the third cable 456, and the fifth cable connector 432. Accordingly, in one or more examples, the fifth riser connector 132 receives the power and sideband signals from the primary system board 204 via the first system board connector 218, one of the first riser connector 104 or the second riser connector 106, the sixth riser connector 134, and the third cable 456.

The fifth riser connector 132 is detachably mated with the third cable connector 458 of the second cable 454 and the fourth cable connector 460 of the second cable 454 is detachably mated with the third system board connector 222 of the primary system board 204. In such examples, the mating of the third cable connector 458 with the fifth riser connector 132 and the mating of the fourth cable connector 460 with the third system board connector 222 occur by a motion of the third and fourth cable connectors 458, 460, respectively along the first vertical direction 11 parallel to the axis 10 and to the circuit board 102. Accordingly, the fifth riser connector 132 receives data signals from the primary system board 204 via the third system board connector 222, the fourth cable connector 460, the second cable 454, and the third cable connector 458. Accordingly, in one or more examples, the fifth riser connector 132 receives the data signals from the primary system board 204 via the third system board connector 222 and the second cable 454.

In some examples, the second expansion card 444 is connected to the direction changeable riser card 100 of the first riser assembly 210 such that the second expansion connector 452 of the second expansion card 444 mates with the fifth riser connector 132 with a mating axis between the second expansion connector 452 and the fifth riser connector 132 being oriented perpendicular to the circuit board 102 and along to the second direction 17 parallel to the first axis 20. Accordingly, the second expansion card 444 receives the power and sideband signals from the primary system board 204 via the sixth riser connector 134. In other words, the fifth riser connector 132, in a mounted state of the direction changeable riser card 100 to the primary system board 204 in the first mounting orientation and the second mounting orientation, mate with the second expansion connector 452 of the second expansion card 444 oriented perpendicular to the circuit board 102 and along the second direction 17. In one or more examples, the first and second expansion cards 442, 444, respectively being vertically stacked relative to one another along the first axis 20.

FIG. 5 depicts a block diagram of a portion of the information processing device 200 of FIG. 4 including a second riser assembly 210A and another second expansion card 444A (or a third expansion card). It may be noted that FIG. 5 depicts a top view of the information processing device 200. The information processing device 200 includes a chassis 202, a primary system board 204, one or more riser assemblies having the first riser assembly 210 and the second riser assembly 210A.

The primary system board 204 is mounted on and coupled to a base 206 of the chassis 202. As discussed herein, the primary system board 204 includes a first system board connector 218 (as shown in FIGS. 1-2 and 4), a second system board connector 220, and a third system board connector 222, each mounted to a face of the primary system board 204. The primary system board 204 further includes some other first system board connectors (or fourth system board connectors 218A, 218B), some other second system board connectors 220A, 220B, and some other third system board connectors 222A, 222B, each mounted to the face of the primary system board 204.

The one or more riser assemblies includes the first riser assembly 210 and the second riser assembly 210A, each including a direction changeable riser card and a riser cage coupling the direction changeable riser card to the chassis 202. For example, the first riser assembly 210 includes the direction changeable riser card 100 and the riser cage 211 coupling the direction changeable riser card 100 to the chassis 202. Similarly, the second riser assembly 210A includes a direction changeable riser card 100A and a riser cage 211A coupling the second direction changeable riser card 100A to the chassis 202. In such examples, the direction changeable riser card of each of the first and second riser assemblies 210, 210A includes a circuit board, a first riser connector, a second riser connector, a third riser connector, a fourth riser connector, a fifth riser connector, and a sixth riser connector. For example, the direction changeable riser card 100 of the first riser assembly 210 includes a circuit board 102, a first riser connector 104 (as shown in FIGS. 1-2 and 4), a second riser connector 106, a third riser connector 108, a fourth riser connector 110 (as shown in FIGS. 1-2 and 4), a fifth riser connector 132, and a sixth riser connector 134 (as shown in FIGS. 1-2 and 4). Similarly, the direction changeable riser card 100A of the second riser assembly 210A includes a circuit board 102A, a first riser connector 104A, a second riser connector 106A, a third riser connector 108A, a fourth riser connector 110A, a fifth riser connector (not shown), and a sixth riser connector (not shown).

The first riser connector 104 is positioned at a first edge 122 (as shown in FIGS. 1-2 and 4) of the circuit board 102. The second riser connector 106 is positioned at a second edge 124 opposite to the first edge 122 of the circuit board 102. The third riser connector 108 is positioned at the second edge 124 and adjacent to the second riser connector 106. The fourth riser connector 110 is mounted to a face 128 of the circuit board 102 and electrically connected to the first, second, and third riser connectors 104, 106, 108. Similarly, the first riser connector 104A is positioned at a first edge 122A (as shown in FIGS. 1-2 and 4) of the circuit board 102A. The second riser connector 106A is positioned at a second edge (not shown) 124A opposite to the first edge 122A of the circuit board 102A. The third riser connector 108A is positioned at the second edge and adjacent to the second riser connector 106A. The fourth riser connector 110A is mounted to a face 128A of the circuit board 102A and electrically connected to the first, second, and third riser connectors 104A, 106A, 108A.

The respective direction changeable riser cards 100, 100A of the one or more riser assemblies are mountable on the primary system board 204 in a first mounting orientation and a second mounting orientation. The first mounting orientation associated with the circuit board 102 being perpendicular to the primary system board 204 and the face 128 of the circuit board facing along a first direction 15 parallel to the first axis 20, and the second mounting orientation associated with the circuit board 102A being perpendicular to the primary system board 204 and the face 128A of the circuit board 102A facing along a second direction 17 opposite the first direction 15 which is parallel to the first axis 20.

In some examples, the direction changeable riser card 100 of the first riser assembly 210 is mounted on the primary system board 204 in the first mounting orientation such that the first riser connector 104 is detachably mated with the first system board connector 218 such that the fourth riser connector 110 receives power and sideband signals from the primary system board 204 via the first system board connector 218 and the first riser connector 104. Further, the third riser connector 108 is detachably mated with the first cable connector 238 of the first cable 236 and the second system board connector 220 is detachably mated with the second cable connector 240 such that the fourth riser connector 110 receives data signals from the primary system board 204 via the second system board connector 220, the second cable connector 240, the first cable 236, the first system board connector 218, and the third riser connector 108.

The first expansion card 442 is connected to the direction changeable riser card 100 of the first riser assembly 210 such that a first expansion connector 448 (as shown in FIG. 4) of the first expansion card 442 mates with the fourth riser connector 110 with a mating axis between the first expansion connector 448 and the fourth riser connector 110 being oriented perpendicular to the circuit board 102 and along the second direction 17 parallel to the first axis 20. Further, the second expansion card 444 is connected to the direction changeable riser card 100 of the first riser assembly 210 such that a first expansion connector 448 (as shown in FIG. 4) of the first expansion card 442 mates with the fifth riser connector 132 with a mating axis between the second expansion connector 452 and the fifth riser connector 132 being oriented perpendicular to the circuit board 102 and along the second direction 17 parallel to the first axis 20. In such examples, the first and second expansion cards 442, 244, respectively being vertically stacked relative to one another and parallel to the axis 10.

In some examples, the direction changeable riser card 100 of the first riser assembly may be remountable on the primary system board 204 in the second mounting orientation instead of the first mounting orientation. The second mounting orientation is associated with the circuit board 102 being perpendicular to the primary system board 204 and the face 128 of the circuit board 102 facing the second direction 17 parallel to the first axis 20 such that the second and third riser connectors 106, 108 may be detachably mated with the first system board connector 218 such that: the fourth riser connector 110 receives the power and sideband signals from the primary system board 204 via the first system board connector 218 and the second riser connector 106. The fourth riser connector 110 further receives the data signals from the primary system board 204 via the first system board connector 218 and the third riser connector 108.

The direction changeable riser card 100A of the second riser assembly 210A is mounted on the primary system board 204 in the second mounting orientation. In such examples, in the second mounting orientation the second and third riser connectors 106A, 108A are detachably mated with the fourth system board connector 218A such that the fourth riser connector 110A receives the power and sideband signals from the primary system board 204 via the fourth system board connector 218A and the second riser connector 106A, and the fourth riser connector 110A further receives the data signals from the primary system board 204 via the fourth system board connector 218A and the third riser connector 108A. In such examples, the other second expansion card 444A is connected to the direction changeable riser card 100A of the second riser assembly 210A such that a second expansion connector 452A of the second expansion card 444 mates with the fourth riser connector 110A with a mating axis between the other second expansion connector 452A and the fourth riser connector 110A being oriented perpendicular to the circuit board 102A and along to the first direction 15 parallel to the first axis 20. Accordingly, the first and second expansion cards 442, 444A is coupled to the direction changeable riser cards 100, 100A of the first and second riser assemblies 210, 201A, respectively, with the first and second expansion cards 442, 444A being disposed in laterally adjacent one another along the first axis 20 with the direction changeable riser cards 100, 100A of the first and second riser assemblies 210, 2101A disposed therebetween.

Figure 6:
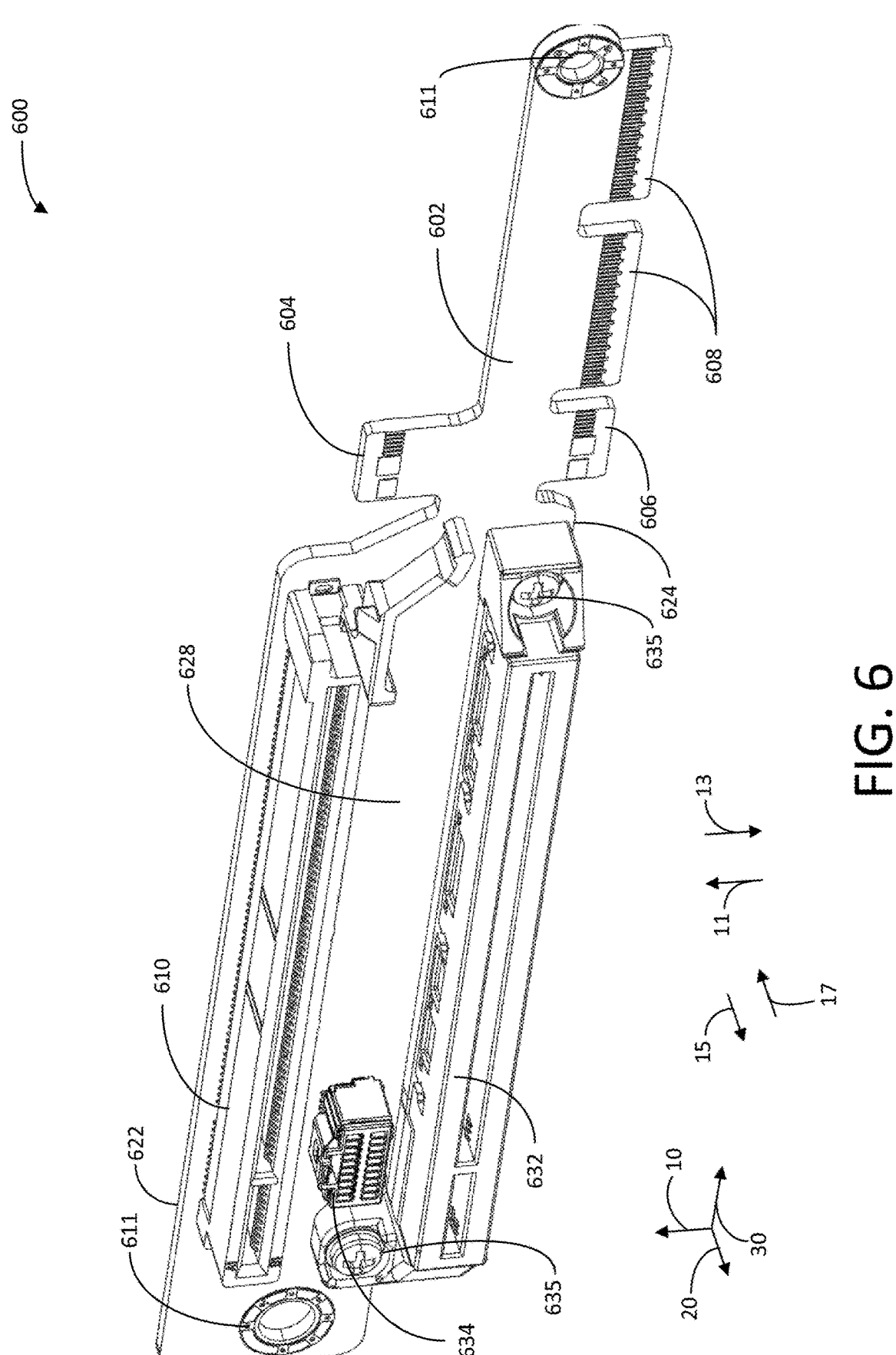
FIG. 6 illustrates a perspective view of a direction changeable riser card according to an example of the present disclosure.

FIG. 6 depicts a perspective view of a direction changeable riser card 600. The direction changeable riser card 600 includes a circuit board 602, a plurality of electrical connectors, e.g., a first riser connector 604, a second riser connector 606, a third riser connector 608, a fourth riser connector 610, a fifth riser connector 632, a sixth riser connector 634, a plurality of mounting holes 611, and a plurality of mounting features 635.

The first riser connector 604 is positioned at a first edge 622 of the circuit board 602. For example, the first riser connector 604 extends along a first vertical direction 11 parallel to the axis 10. The second riser connector 606 is positioned at a second edge 624 opposite to the first edge 622 of the circuit board 602. The third riser connector 608 is positioned at the second edge 624 and adjacent to the second riser connector 606. For example, each of the second and third riser connectors 606, 608 extend along a second vertical direction 13 opposite to the first vertical direction and parallel to the axis 10. The fourth riser connector 610 is mounted to a face 628 of the circuit board 102 and may be electrically connected to the first, second, and third riser connectors 604, 608, 610, respectively. The fifth riser connector 632 is disposed adjacent to the first riser connector 604 and mounted to the face 628 of the circuit board 602. The sixth riser connector 634 is mounted to the face 628 of the circuit board 602 and may be electrically connected to the first riser connector 604 and the second riser connector 606. The plurality of mounting holes 611 may be configured to couple the direction changeable riser card 600 to a riser cage (not shown) of a riser assembly. The plurality of mounting features 635 is used to connect the fifth riser connector 632 to the face 628 at the second edge 624 of the circuit board 602.

Figure 7:
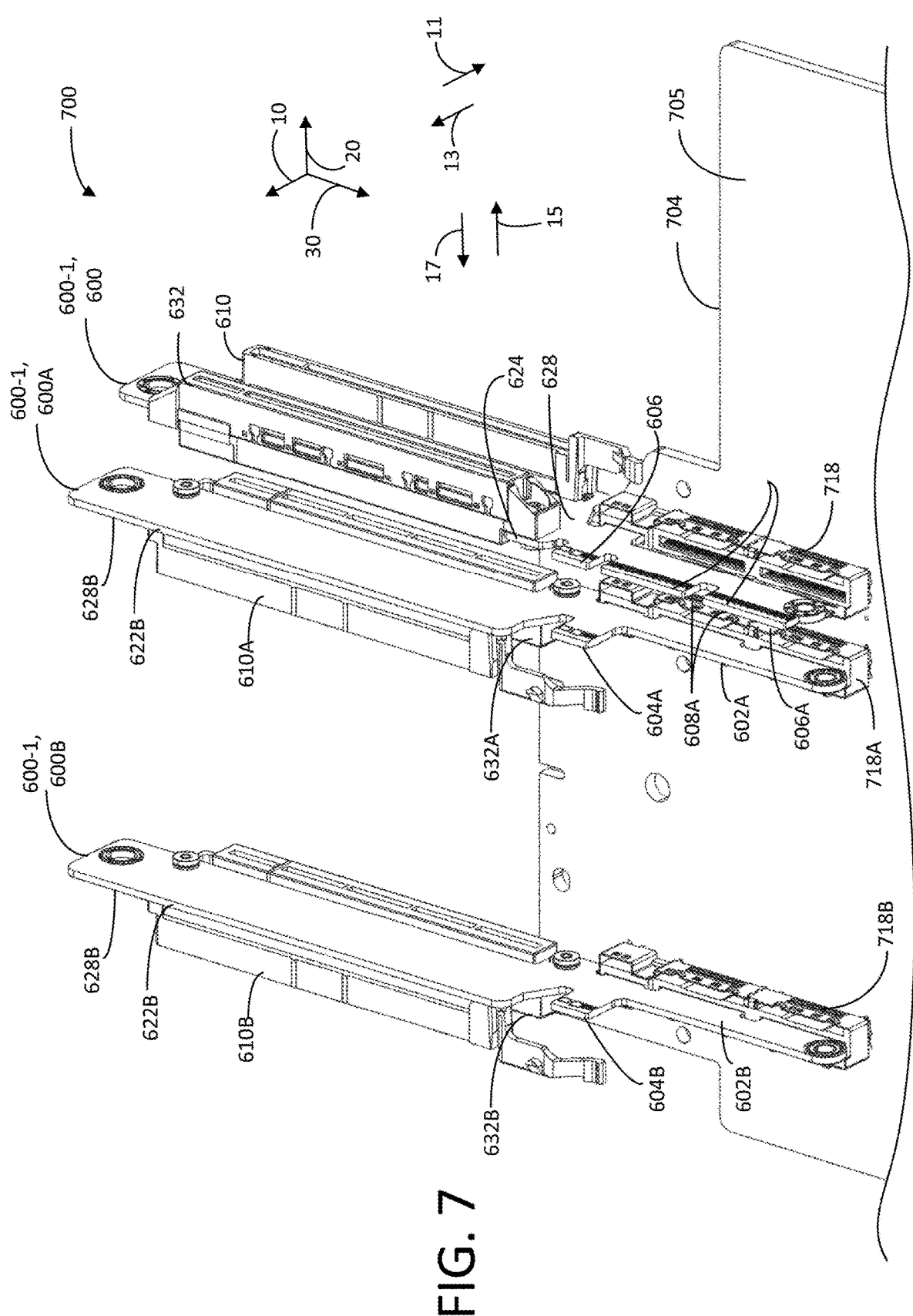
FIG. 7 illustrates a perspective view of a portion of an information processing device having a primary system board and a plurality of direction changeable riser cards mounted on the primary system board according to an example of the present disclosure.

The direction changeable riser card 600 may be configured to be interchangeably mountable on a primary system board 704 (as shown in FIG. 7) of an information processing device 700 in a first mounting orientation associated with the face 628 of the circuit board 102 facing along a first direction 15. The direction changeable riser card 600 may be flipped upside down to orient the direction changeable riser card 600 in a second mounting orientation that is associated with the face 628 of the circuit board 602 facing along a second direction 17 opposite to the first direction 15, with the circuit board 602 being perpendicular to the primary system board 704. In particular, in the first mounting orientation, the first riser connector 604 may be detachably mated with a first system board connector 718 (as shown in FIG. 7) of the primary system board such that the fourth riser connector 610 receives power and sideband signals from the first system board connector 718 via the first riser connector 604, and the third riser connector 608 may be detachably mated with a first cable connector of a first cable (not shown), which further includes a second cable connector detachably mated with a second system board connector (not shown) of the primary system board such that the fourth riser connector 610 receives data signals from the second system board connector via the first cable and the third riser connector 608. Similarly, in the second mounting orientation, the second and third riser connectors 606, 608 may be detachably mated with the first system board connector 718 such that the fourth riser connector 610 receives the power and sideband signals, and the data signals, from the first system board connector 718 via the second riser connector 606 and the third riser connector 608, respectively.

The fifth riser connector 632 may be detachably mated with a third cable connector of a second cable (not shown), which further includes a fourth cable connector mated with a third system board connector (not shown) of the primary system board 704 such that the fifth riser connector receives the data signals from the third system board connector via the second cable. The fifth riser connector 632 may be further detachably mated with a fifth cable connector of a third cable (not shown), which further includes a sixth cable connector mated with the sixth riser connector such that the fifth riser connector 632 receives the power and sideband signals from the first system board connector 718 via one of the first riser connector 604 or the second riser connector 606, the sixth riser connector 634, and the third cable.

Figure 8:
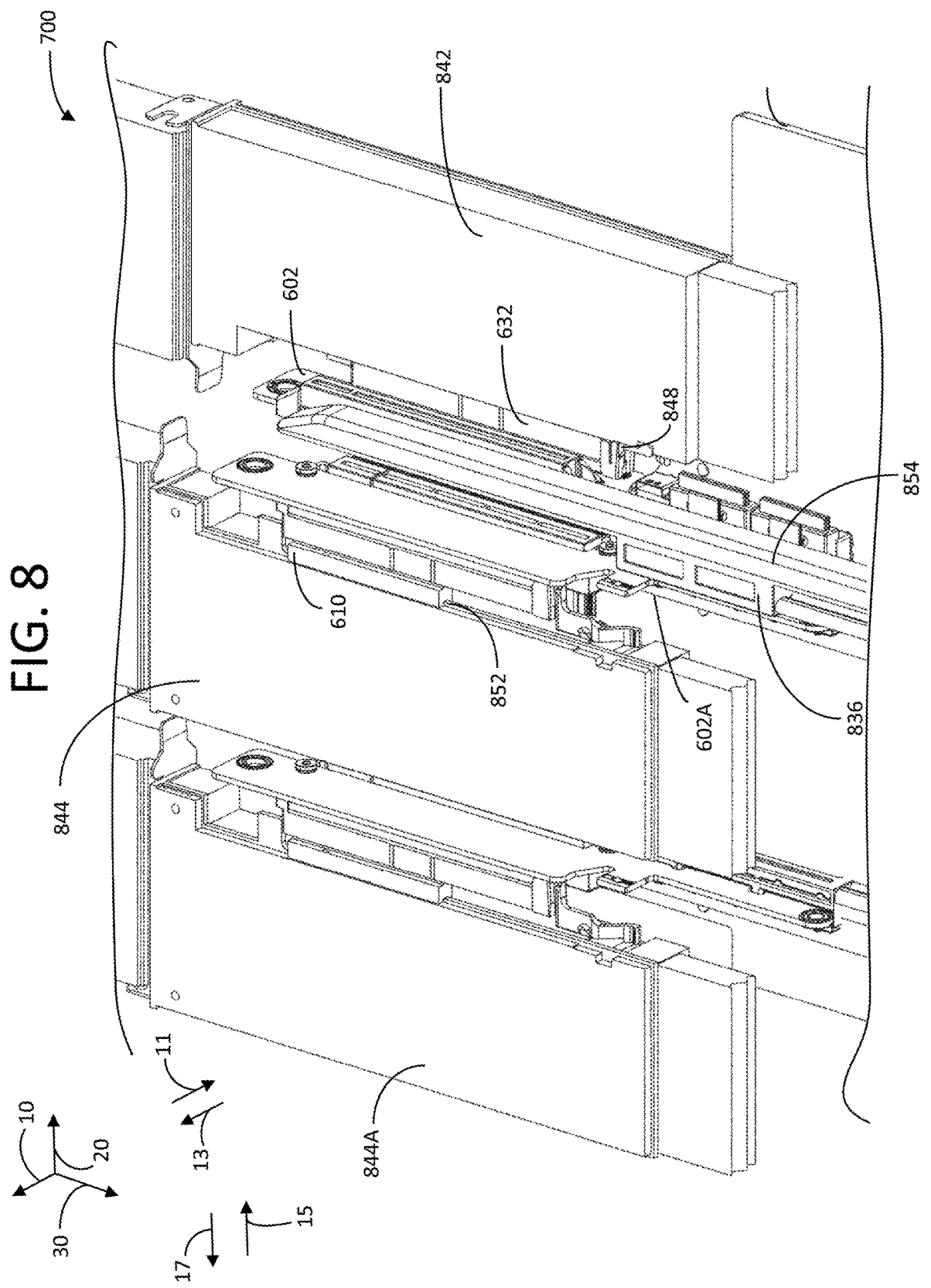
FIG. 8 illustrates a perspective view of the portion of an information processing device of FIG. 7 having a first expansion card, a second expansion card, and a third expansion card according to an example of the present disclosure.

In some examples, the fourth riser connector 610 may be configured to mate with a first expansion connector 848 (as shown in FIG. 8) of a first expansion card 842 oriented perpendicular to the circuit board 102. Further, the fifth riser connector 632 may be configured to mate with a second expansion connector 652 of a second expansion card 644 oriented perpendicular to the circuit board 602. In such examples, the first and second expansion cards 642, 644 may be vertically stacked relative to one another.

FIG. 7 depicts a perspective view of a portion of an information processing device 700. In some examples, the portion of the information processing device 700, such as a computer includes a chassis (not shown), a primary system board 704, and one or more riser assemblies (not labeled), and a cable assembly (not shown). It may be noted herein the chassis, a riser cage, and the cable assembly are not shown for ease of illustration and such non-illustration of those components should not be construed as limitation of the present disclosure.

The chassis may include a base configured to provide support for the primary system board 704 and components mounted thereon. The primary system board 704 may be coupled to the chassis and includes first system board connector 718, 718A, 718B, and second system board connectors (not shown), and third system board connectors (not shown), each mounted to a face 705 of the primary system board 704. In particular, each system board connectors extend along a second vertical direction 13 parallel to the axis 10. The cable assembly may include a first cable 836 (as shown in FIG. 8), a second cable 854 (as shown in FIG. 8), and a third cable (not shown), each configured to interconnect two riser connectors to one another or interconnect one riser connector to the system board connector. The one or more riser assemblies includes a first riser assembly, a second riser assembly, and a third riser assembly. In such examples, each riser assembly of the one or more riser assemblies includes a direction changeable riser card and a riser cage (not shown) configured to couple the direction changeable riser card to the chassis. The direction changeable riser card of each riser assembly, for example, the first riser assembly includes a circuit board 602, a plurality of electrical connectors, e.g., a first riser connector 604, a second riser connector 606, a third riser connector 608, a fourth riser connector 610, a fifth riser connector 632, a sixth riser connector 634, a plurality of mounting holes 611, and a plurality of mounting features 635. Referring to FIG. 6 along with FIG. 7, in such examples, the first riser connector 604 is positioned at a first edge 622 of the circuit board 602. For example, the first riser connector 604 extends along a first vertical direction 11 parallel to the axis 10. The second riser connector 606 is positioned at a second edge 624 opposite to the first edge 622 of the circuit board 602. The third riser connector 608 is positioned at the second edge 624 and adjacent to the second riser connector 606. For example, each of the second and third riser connectors 606, 608 extend along a second vertical direction 13 opposite to the first vertical direction and parallel to the axis 10. The fourth riser connector 610 is mounted to a face 628 of the circuit board 102 and may be electrically connected to the first, second, and third riser connectors 604, 608, 610, respectively. The fifth riser connector 632 is disposed adjacent to the first riser connector 604 and mounted to the face 628 of the circuit board 602. The sixth riser connector 634 is mounted to the face 628 of the circuit board 602 and may be electrically connected to the first riser connector 604 and the second riser connector 606. The plurality of mounting holes 611 may be configured to couple the direction changeable riser card 600 to a riser cage (not shown) of a riser assembly. The plurality of mounting features 635 is used to connect the fifth riser connector 632 to the face 628 at the second edge 624 of the circuit board 602.

In some examples, respective direction changeable riser cards of the one or more riser assemblies are mountable on the primary system board 704 in a first mounting orientation and a second mounting orientation. In some examples, the direction changeable riser card 600 is mounted in the first mounting orientation, The first mounting orientation is associated with the circuit board 602 being perpendicular to the primary system board 704 and the face 628 of the circuit board 602 facing along a first direction 15. In such examples, when the direction changeable riser card 600 is mounted on the primary system board 704 in the first mounting orientation, the first riser connector 614 is detachably mated with the first system board connector 618 such that the fourth riser connector 610 receives power and sideband signals from the primary system board 704 via the first system board connector 618 and the first riser connector 604. Further, the third riser connector 606 is detachably mated with the first cable connector (not shown) such that the fourth riser connector 610 receives data signals from the primary system board 704 via the second system board connector, the first cable, and the third riser connector 606.

Even though not illustrated, in some other examples, the direction changeable riser card 600 of the first riser assembly may be configured to be remountable on the primary system board 704 in the second mounting orientation instead of the first mounting orientation. In such examples, the second mounting orientation is associated with the circuit board 602 being perpendicular to the primary system board 704 and the face 628 of the circuit board 602 facing the second direction 17 such that the second and third riser connectors 606, 608 are detachably mated with the first system board connector 718 such that the fourth riser connector 610 receives the power and sideband signals from the primary system board 704 via the first system board connector 718 and the second riser connector 606, and the fourth riser connector 610 further receives the data signals from the primary system board 704 via the first system board connector 718 and the third riser connector 608.

Further, in some examples, each of the second and third direction changeable riser cards 600A, 600B is mounted in the second mounting orientation on the primary system board 704. In particular, referring to the second direction changeable riser card 600A, the second mounting orientation is associated with the circuit board 602A being perpendicular to the primary system board 704 and the face 628A of the circuit board 602A facing along a second direction 17 opposite to the first direction 15. In such examples, when the second direction changeable riser card 600A is mounted on the primary system board 704 in the second mounting orientation, the second and third riser connectors 606A, 608A of the second direction changeable riser card 600A are detachably mated with the first system board connector 718A such that the fourth riser connector 610A receives the power and sideband signals from the primary system board 704 via the first system board connector 718A and the second riser connector 606A, and the fourth riser connector 610A further receives the data signals from the primary system board 704 via the first system board connector 718A and the third riser connector 608A.

FIG. 8 depicts a perspective view of the portion of an information processing device 700 of FIG. 7 having a first expansion card 842, a second expansion card 844, and a third expansion card 844A.

In some examples, the first expansion card 842 is connected to the direction changeable riser card 600 of the first riser assembly such that a first expansion connector 848 of the first expansion card 842 mates with the fifth riser connector 632 with a mating axis between the first expansion connector 848 and the fifth riser connector 632 being oriented perpendicular to the circuit board 602 and along the second direction 17.

Further, the second expansion card 844 is connected to the second direction changeable riser card 600A of the second riser assembly such that a second expansion connector 852 of the second expansion card 844 mates with the fourth riser connector 610A with a mating axis between the second expansion connector 852 and the fourth riser connector 610A being oriented perpendicular to the circuit board 602A and parallel to the first direction 15. In such examples, the first and second expansion cards 842, 844 are coupled to the direction changeable riser cards 600, 600A of the first and second riser assemblies, respectively, with the first and second expansion cards 842, 844 being disposed in laterally adjacent one another with the direction changeable riser cards 600, 600A of the first and second riser assemblies disposed therebetween. The third expansion card 844A is connected to the third direction changeable riser card 600B as discussed herein with the second expansion card 844 being connected to the second direction changeable riser card 600A.

FIG. 9 depicts a flowchart showing a method 900 of assembling a riser cage bracket. It may be noted herein that the method 900 is described in conjunction with FIGS. 1-8 for example. The method 900 starts at block 902 and continues to block 904.

At block 904, the method 900 includes mounting the direction changeable riser card on a primary system board of the information processing device in a first mounting orientation, such that a first riser connector of the direction changeable riser card is detachably mated with a first system board connector mounted to a face of the primary system board. In some examples, the first riser connector is positioned at a first edge of a circuit board of the direction changeable riser card. Further, the direction changeable riser card further includes a second riser connector positioned at a second edge opposite to the first edge of the circuit board and a third riser connector positioned at the second edge and adjacent to the second riser connector. The first mounting orientation is associated with the circuit board being perpendicular to the primary system board, and a face of the circuit board facing along a first direction. The method 900 continues to block 906.

At block 906, the method 900 includes detachably mating a first cable connector of a first cable to the third riser connector, and a second cable connector of the first cable to a second system board connector mounted to the face of the primary system board. The method 900 continues to block 908.

At block 908, the method 900 further includes connecting a first expansion card to the direction changeable riser card such that a first expansion connector of the first expansion card mates with a fourth riser connector of the direction changeable riser card. In some examples, a mating axis of the first expansion connector and the fourth riser connector is perpendicular to the circuit board. Further, the fourth riser connector is mounted to the face of the circuit board and electrically connected to the first, second, and third riser connectors. The fourth riser connector is configured to receive power and sideband signals from the first system board connector via the first riser connector, and data signals from the second system board connector via the first cable, and the third riser connector.

In some examples, the method 900 further includes disconnecting the first expansion card from the direction changeable riser card, disconnecting the first cable connector from the third riser connector, and unmounting the direction changeable riser card from the primary system board. The method 900 further includes remounting the direction changeable riser card on the primary system board in a second mounting orientation, such that the second riser connector and the third riser connector are detachably mated with the first system board connector. In such examples, the second mounting orientation is associated with the circuit board being perpendicular to the primary system board, and the face of the circuit board facing along a second direction opposite to the first direction. The method 900 further includes reconnecting the first expansion card to the direction changeable riser card such that the first expansion connector mates with the fourth riser connector, where the fourth riser connector is mounted to the face of the circuit board and electrically connected to the first, second, and third riser connectors, and configured to receive the power and sideband signals, and the data signals from the first system board connector of the primary system board via the second riser connector and the third riser connector, respectively.

In some examples, the method 900 further includes connecting a second expansion card to the direction changeable riser card such that a second expansion connector of the second expansion card mates with a fifth riser connector of the direction changeable riser card. In such examples, a mating axis of the second expansion connector and the fourth riser connector is perpendicular to the circuit board. The fifth riser connector is disposed adjacent to the first riser connector and mounted to the face of the circuit board. The fifth riser connector is detachably mated with a third cable connector of a second cable, which further includes a fourth cable connector mated with a third system board connector mounted to the face of the primary system board such that the fifth riser connector receives the data signals from the third system board connector via the second cable. Further, the fifth riser connector is further detachably mated with a fifth cable connector of a third cable, which further includes a sixth cable connector mated with a sixth riser connector mounted to the face of the circuit board and electrically connected to the first riser connector and the second riser connector, such that the fifth riser connector receives the power and sideband signals from the first system board connector via one of the first riser connector or the second riser connector, the sixth riser connector, and the third cable. The method 900 ends at block 910.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A direction changeable riser card comprising:

a circuit board;

a first riser connector positioned at a first edge of the circuit board;

a second riser connector positioned at a second edge opposite to the first edge of the circuit board;

a third riser connector positioned at the second edge and adjacent to the second riser connector; and a fourth riser connector mounted to a face of the circuit board and electrically connected to the first, second, and third riser connectors, and configured to mate with a first expansion connector of a first expansion card oriented perpendicular to the circuit board, wherein the direction changeable riser card is configured to be interchangeably mountable on a primary system board of an information processing device in a first mounting orientation associated with the face of the circuit board facing along a first direction, and in a second mounting orientation associated with the face of the circuit board facing along a second direction opposite to the first direction, with the circuit board being perpendicular to the primary system board such that:

in the first mounting orientation, the first riser connector is detachably mated with a first system board connector of the primary system board such that the fourth riser connector receives power and sideband signals from the first system board connector via the first riser connector, and the third riser connector is detachably mated with a first cable connector of a first cable, which further includes a second cable connector detachably mated with a second system board connector of the primary system board such that the fourth riser connector receives data signals from the second system board connector via the first cable and the third riser connector, and in the second mounting orientation, the second and third riser connectors are detachably mated with the first system board connector such that the fourth riser connector receives the power and sideband signals, and the data signals, from the first system board connector via the second riser connector and the third riser connector, respectively.

2. The direction changeable riser card of claim 1, wherein each of the first, second, and third riser connectors is an edge connector, the fourth riser connector is a PCI-e socket connector, the first expansion connector is a PCI-e plug connector, the first system board connector is a modular extensible input output (M-XIO) connector, the second system board connector is a modular extensible input output receptacle connector, each of the first and second system board connectors are mounted to a face of the primary system board, the first cable connector is a modular extensible input output receptacle connector of the first cable, and the second cable connector is a modular extensible input output plug connector of the first cable.

3. The direction changeable riser card of claim 1, further comprising a fifth riser connector disposed adjacent to one of the first or second riser connectors and mounted to the face of the circuit board and configured to mate with a second expansion connector of a second expansion card oriented perpendicular to the circuit board, and wherein the first and second expansion cards being vertically stacked relative to one another.

4. The direction changeable riser card of claim 3, further comprising a sixth riser connector mounted to the face of the circuit board and electrically connected to the first riser connector and the second riser connector.

5. The direction changeable riser card of claim 4, wherein the fifth riser connector is detachably mated with a third cable connector of a second cable, which further includes a fourth cable connector mated with a third system board connector of the primary system board such that the fifth riser connector receives the data signals from the third system board connector via the second cable, and wherein the fifth riser connector is further detachably mated with a fifth cable connector of a third cable, which further includes a sixth cable connector mated with the sixth riser connector such that the fifth riser connector receives the power and sideband signals from the first system board connector via one of the first riser connector or the second riser connector, the sixth riser connector, and the third cable.

6. The direction changeable riser card of claim 5, wherein the fifth riser connector is a PCI-e socket connector, the sixth riser connector is a socket connector, the second expansion connector is a PCI-e plug connector, the third system board connector is a modular extensible input output receptacle connector mounted to a face of the primary system board, the third cable connector is a PCI-e plug connector, the fourth cable connector is a modular extensible input output plug connector, the fifth cable connector is the PCI-e plug connector, and the sixth cable connector is a plug connector.

7. An information processing device comprising:

a chassis;

a primary system board coupled to the chassis and comprising a first system board connector and a second system board connector each mounted to a face of the primary system board;

a cable assembly comprising a first cable including a first cable connector and a second cable connector, the second cable connector mated with the second system board connector; and one or more riser assemblies, each comprising a direction changeable riser card and a riser cage coupling the direction changeable riser card to the chassis, the direction changeable riser card comprising:

a circuit board;

a first riser connector positioned at a first edge of the circuit board;

a second riser connector positioned at a second edge opposite to the first edge of the circuit board;

a third riser connector positioned at the second edge and adjacent to the second riser connector; and a fourth riser connector mounted to a face of the circuit board and electrically connected to the first, second, and third riser connectors, wherein respective direction changeable riser cards of the one or more riser assemblies are mountable on the primary system board in a first mounting orientation and a second mounting orientation, the first mounting orientation associated with the circuit board being perpendicular to the primary system board and the face of the circuit board facing along a first direction, and the second mounting orientation associated with the circuit board being perpendicular to the primary system board and the face of the circuit board facing along a second direction opposite the first direction, wherein the direction changeable riser card of a first riser assembly of the one or more riser assemblies is mounted on the primary system board in the first mounting orientation such that:

the first riser connector is detachably mated with the first system board connector such that the fourth riser connector receives power and sideband signals from the primary system board via the first system board connector and the first riser connector, and the third riser connector is detachably mated with the first cable connector and the second system board connector is detachably mated with the second cable connector such that the fourth riser connector receives data signals from the primary system board via the second system board connector, the second cable connector, the first cable, the first system board connector, and the third riser connector.

8. The information processing device of claim 7, further comprising a first expansion card connected to the direction changeable riser card of the first riser assembly such that a first expansion connector of the first expansion card mates with the fourth riser connector with a mating axis between the first expansion connector and the fourth riser connector being oriented perpendicular to the circuit board and along the second direction.

9. The information processing device of claim 8, wherein each of the first, second, and third riser connectors is an edge connector, the fourth riser connector is a PCI-e socket connector, the first expansion connector is a PCI-e plug connector, the first system board connector is a modular extensible input output (M-XIO) connector, the second system board connector is a modular extensible input output receptacle connector, each of the first and second system board connectors are mounted to a face of the primary system board, the first cable connector is a modular extensible input output receptacle connector of the first cable, and the second cable connector is a modular extensible input output plug connector of the first cable.

10. The information processing device of claim 8, wherein the direction changeable riser card of the first riser assembly is configured to be remountable on the primary system board in the second mounting orientation instead of the first mounting orientation, wherein the second mounting orientation is associated with the circuit board being perpendicular to the primary system board and the face of the circuit board facing the second direction such that:

the second and third riser connectors are detachably mated with the first system board connector such that the fourth riser connector receives the power and sideband signals from the primary system board via the first system board connector and the second riser connector, and the fourth riser connector further receives the data signals from the primary system board via the first system board connector and the third riser connector.

11. The information processing device of claim 10, wherein the direction changeable riser card further comprises a fifth riser connector disposed adjacent to the one of the first or second riser connectors and mounted to the face of the circuit board and configured to, in a mounted state of the direction changeable riser card to the primary system board in the first mounting orientation and the second mounting orientation, mate with a second expansion connector of a second expansion card oriented perpendicular to the circuit board and along the first direction, and wherein the first and second expansion cards being vertically stacked relative to one another.

12. The information processing device of claim 11, wherein the direction changeable riser card further comprises a sixth riser connector mounted to the face of the circuit board and electrically connected to the first riser connector and the second riser connector.

13. The information processing device of claim 12, wherein the primary system board further comprises a third system board connector mounted to the face of the primary system board, and wherein the cable assembly further comprises a second cable including a third cable connector and a fourth cable connector, and a third cable including a fifth cable connector and a sixth cable connector, the fourth cable connector of the second cable mated with the third system board connector, the sixth cable connector of the third cable mated with the sixth riser connector.

14. The information processing device of claim 13, wherein the fifth riser connector is detachably mated with the third cable connector of the second cable such that the fifth riser connector receives the data signals from the primary system board via the third system board connector and the second cable, and wherein the fifth riser connector is further detachably mated with the fifth cable connector of the third cable such that the fifth riser connector further receives the power and sideband signals from the primary system board via the first system board connector, one of the first riser connector or the second riser connector, the sixth riser connector, and the third cable.

15. The information processing device of claim 14, wherein the fifth riser connector is a PCI-e socket connector, the sixth riser connector is a socket connector, the second expansion connector is a PCI-e plug connector, the third system board connector is a modular extensible input output receptacle connector mounted to a face of the primary system board, the third cable connector is a PCI-e plug connector, the fourth cable connector is a modular extensible input output plug connector, the fifth cable connector is the PCI-e plug connector, and the sixth cable connector is a plug connector.

16. The information processing device of claim 8, wherein the primary system board further comprises a fourth system board connector mounted to the face of the primary system board, wherein the one or more riser assemblies further comprises a second riser assembly, the direction changeable riser card of the second riser assembly is mounted on the primary system board in the second mounting orientation such that:

the second and third riser connectors are detachably mated with the fourth system board connector such that the fourth riser connector receives the power and sideband signals from the primary system board via the fourth system board connector and the second riser connector, and the fourth riser connector further receives the data signals from the primary system board via the fourth system board connector and the third riser connector.

17. The information processing device of claim 16, further comprising a second expansion card connected to the direction changeable riser card of the second riser assembly such that a second expansion connector of the second expansion card mates with the fourth riser connector with a mating axis between the second expansion connector and the fourth riser connector being oriented perpendicular to the circuit board and along the first direction, and wherein the first and second expansion cards coupled to the direction changeable riser cards of the first and second riser assemblies, respectively, with the first and second expansion cards being disposed in laterally adjacent one another with the direction changeable riser cards of the first and second riser assemblies disposed therebetween.

18. A method of installing a direction changeable riser card and one or more expansion cards in an information processing device, comprising:

mounting the direction changeable riser card on a primary system board of the information processing device in a first mounting orientation, such that a first riser connector of the direction changeable riser card is detachably mated with a first system board connector mounted to a face of the primary system board, wherein the first riser connector is positioned at a first edge of a circuit board of the direction changeable riser card, wherein the direction changeable riser card further comprises a second riser connector positioned at a second edge opposite to the first edge of the circuit board and a third riser connector positioned at the second edge and adjacent to the second riser connector, and wherein the first mounting orientation is associated with the circuit board being perpendicular to the primary system board, and a face of the circuit board facing along a first direction;

detachably mating a first cable connector of a first cable to the third riser connector, and a second cable connector of the first cable to a second system board connector mounted to the face of the primary system board; and connecting a first expansion card to the direction changeable riser card such that a first expansion connector of the first expansion card mates with a fourth riser connector of the direction changeable riser card, wherein a mating axis of the first expansion connector and the fourth riser connector is perpendicular to the circuit board, wherein the fourth riser connector is mounted to the face of the circuit board and electrically connected to the first, second, and third riser connectors, and wherein the fourth riser connector is configured to receive power and sideband signals from the first system board connector via the first riser connector, and data signals from the second system board connector via the first cable, and the third riser connector.

19. The method of claim 18, further comprising:

disconnecting the first expansion card from the direction changeable riser card, disconnecting the first cable connector from the third riser connector, and unmounting the direction changeable riser card from the primary system board;

remounting the direction changeable riser card on the primary system board in a second mounting orientation, such that the second riser connector and the third riser connector are detachably mated with the first system board connector, wherein the second mounting orientation is associated with the circuit board being perpendicular to the primary system board, and the face of the circuit board facing along a second direction opposite to the first direction; and reconnecting the first expansion card to the direction changeable riser card such that the first expansion connector mates with the fourth riser connector, wherein the fourth riser connector is mounted to the face of the circuit board and electrically connected to the first, second, and third riser connectors, and configured to receive the power and sideband signals, and the data signals from the first system board connector of the primary system board via the second riser connector and the third riser connector, respectively.

20. The method of claim 19, further comprising:

connecting a second expansion card to the direction changeable riser card such that a second expansion connector of the second expansion card mates with a fifth riser connector of the direction changeable riser card, wherein a mating axis of the second expansion connector and the fourth riser connector is perpendicular to the circuit board, wherein the fifth riser connector is disposed adjacent to the first riser connector and mounted to the face of the circuit board, wherein the fifth riser connector is detachably mated with a third cable connector of a second cable, which further includes a fourth cable connector mated with a third system board connector mounted to the face of the primary system board such that the fifth riser connector receives the data signals from the third system board connector via the second cable, and wherein the fifth riser connector is further detachably mated with a fifth cable connector of a third cable, which further includes a sixth cable connector mated with a sixth riser connector mounted to the face of the circuit board and electrically connected to the first riser connector and the second riser connector, such that the fifth riser connector receives the power and sideband signals from the first system board connector via one of the first riser connector or the second riser connector, the sixth riser connector, and the third cable.

* * * * *